United States Patent Office 3,379,771
Patented Apr. 23, 1968

3,379,771
OXIDATION INHIBITED POLYPHENYL
ETHER COMPOSITION
Gether Irick, Jr., and Gary F. Hawkins, Kingsport, Tenn., assignors to Eastman Kodak Company, Rochester, N.Y., a corporation of New Jersey
No Drawing. Filed Jan. 15, 1964, Ser. No. 337,744
4 Claims. (Cl. 260—611.5)

ABSTRACT OF THE DISCLOSURE

An oxidation inhibited polyphenyl ether composition comprising a blended mixture of high purity polyphenyl ether having a halogen concentration less than 0.01% by weight and halogenated polyphenyl ether of at least three benzene rings per molecule having halogen substituents selected from the group consisting of chlorine, bromine and fluorine, the total halogen concentration of the composition being in the range of about 0.01% to 0.04% by weight.

DISCLOSURE

This invention relates to the chemical arts. More particularly, it relates to high purity polyphenyl ether products and to the problem of protecting them from oxidative degradation under normal use conditions.

Polyphenyl ethers, for example, bis(phenoxyphenoxy)benzene, commonly referred to as polyphenyl ether 5P4E, which have been known for many years, have only recently been found to possess various properties which make them useful as lubricants under certain, rather extreme conditions. Consequently, processes for making polyphenyl ethers on a commercial scale have recently been developed. These processes, as far as we are aware, have involved a basic generic reaction, namely: the reaction of a halogenated phenyl compound with the sodium or potassium salt of a phenolic compound. The presence of a halide radical in the end product has been regarded as detrimental. Consequently, conditions and steps are employed in these processes whereby the polyphenyl ether products obtained thereby have a vary low halide concentration. We have found, however, that polyphenyl ether products of high purity, that is, those products having halide or halogen concentrations less than 0.01% by weight of the products, are highly susceptible to oxidative degradation under the conditions proposed for their use as lubricants. Hence, the problem of how to minimize under these conditions oxidative degradation of polyphenyl ether products of high purity has been presented.

The Canadian patent, No. 638,987 of Diamond relates to the problem of minimizing oxidative degradation of polyphenyl ethers useful as lubricants. It is based on the concept of admixing the polyphenyl ether with an organo metallic compound such as an indium salt which, particularly when catalytic quantities of copper are present, preferably is in admixture with a bromophenyl ether and a diphenyl monosulfide. Organo metallic compounds in general, however, are not sufficiently soluble in polyphenyl ethers to provide the requisite degree of oxidative stability and, moreover, have the disadvantage of forming insoluble sludges under oxidation conditions.

It has also been proposed to employ aromatic amines to inhibit oxidative degradation of polyphenyl ethers. However, aromatic amines generally tend to cause discoloration of polyphenyl ether compositions after a short period of time.

Consequently, the problem of inhibiting oxidative degradation of polyphenyl ethers has not heretofore been satisfactorily solved.

This invention is based upon the discovery that polyphenyl ethers having halogen substituents selected from the group consisting of fluorine, chlorine and bromine are in and of themselves effective antioxidants for polyphenyl ethers. The antioxidant effect of such halogenated polyphenyl ethers is not significant, however, unless the halogen concentration thereof is at least about 0.01% by weight of the polyphenyl ethers.

In summary, this invention involves a process for making an oxidation inhibited polyphenyl composition from a polyphenyl ether product of high purity, that is, a product having a halide or halogen concentration less than about 0.01% by weight of the product. In brief, this process comprises incorporating into said polyphenyl ether product a quantity of at least one polyphenyl ether having at least one halogen substituent selected from the group consisting of chlorine, fluorine and bromine, said quantity being sufficient to give a total halide concentration of at least about 0.01% by weight of said product.

Polyphenyl ethers, as already indicated, are well known compounds. See, for example, Chemical Abstracts, 1, 437 (1907); 29, 4337; 45, 2733; and 45, 6598. Under the concepts of this invention the polyphenyl ether portion of the polyphenyl ether product of high purity can be just one polyphenyl ether. The linkages can be all ortho, meta or para, or the linkages can be mixed. Instead of just one polyphenyl ether the polyphenyl ether portion can be a mixture of polyphenyl ethers. In such a mixture the polyphenyl ethers can differ from one another by linkage, by molecular content and by both linkage and molecular content. Hence, the concepts of this invention are applicable to polyphenyl ethers broadly.

Polyphenyl ethers substituted with at least one halogen selected from the group consisting of chlorine, fluorine and bromine are readily made. One process for making these compounds is to react a polyphenyl ether with a halogen selected from the group. This can be done merely by contacting the polyphenyl ether with the halogen at 50–60° C. Another process for making such a compound is to react an alkali metal salt of a phenolic phenyl ether, for example, m-phenoxyphenol, with benzene disubstituted with a halogen selected from the group. This is readily accomplished by admixing the reactants and a copper catalyst at a temperature in a range from about 180 to 250° C. Any copper metal or salt can be employed as the catalyst. Under the concepts of this invention the chlorinated polyphenyl ethers are preferred over the fluorinated and the brominated polyphenyl ethers because they give to polyphenyl ether products of high purity a greater degree of oxidative stability with less attenuation of the thermal stability, and also because under present conditions they are more economical to make.

Maximum, halide concentration of the polyphenyl ether composition made according to this invention is dependent somewhat on the degree of inhibition of oxidative degradation desired and on the extent to which thermal instability of the composition can be tolerated. In this connection, the presence of a halogenated polyphenyl ether lowers the resistance of polyphenyl ethers to thermal decomposition. However, for most polyphenyl ether lubricant uses, a halide concentration in a range from about 0.01 to about 0.04% by weight of the polyphenyl ether product gives satisfactory results.

The step of incorporating into the polyphenyl ether product of high purity a halide substituted polyphenyl ether according to this invention can be carried out in a number of ways. In one specific embodiment of the process of this invention, the desired quantity of polyphenyl ether substituted by a member selected from the group consisting of chlorine, fluorine and bromine is admixed or blended with the polyphenyl ether product. In another specific embodiment of the process of this invention, the polyphenyl ether product of high purity is partially halogenated with a halogen selected from the group consisting of chlorine, fluorine and bromine to give a polyphenyl ether composition having the desired concentration of halogenated polyphenyl ether.

This invention is further illustrated by the following examples of various aspects of the invention, including specific embodiments thereof. This invention is not limited to these specific embodiments unless otherwise indicated.

Example 1

This example illustrates the preparation of a polyphenyl ether substituted by fluorine.

6 grams (0.254 mole) of dibromobenzene, 112 grams (0.53 mole) potassium salt of 4'-fluoro-m-phenoxyphenol, and 5 grams (0.035 mole) of cuprous oxide are admixed in a reactor and the temperature of the mixture thus formed is established and maintained at 185° C. for four hours. Thereafter, the resulting reaction mixture is washed free of inorganic material and then distilled. The product obtained by the distillation is a viscous yellow oil containing typically 7.9% by weight fluorine. A typical quantity thus obtained is 122 grams. This oil consists essentially of bis(4'-fluorophenoxyphenoxy) benzene (about 0.183 mole, representing a yield of about 77%).

Example 2

This example illustrates the preparation of a polyphenyl ether substituted by bromine.

236 grams (1 mole) of mixed isomeric dibromobenzene, 563 grams (2.5 moles) of the potassium salt of m-phenoxyphenol and 5 grams (0.035 mole) of cuprous oxide oxyphenol and 5 grams (0.035 mole) of cuprous oxide are admixed in a reactor. The temperature of the resulting mixture is established and maintained at 180° C. for three hours. The reaction mixture which results is water washed and then distilled. The product thus obtained is a colorless polyphenyl ether containing bromine typically at a concentration of 0.086% by weight of the product. A typical quantity of product thus obtained is about 200 grams representing about 0.448 mole of the desired compound. The product consists essentially of monobromo bis(phenoxy)benzene and lesser concentrations of higher molecular weight, halogen substituted, polyphenol ethers.

Example 3

This example illustrates the preparation of a polyphenyl ether substituted by chlorine.

Chlorine gas is passed into 700 grams (3.76 moles) of m-phenoxyphenol established and maintained at a temperature of 60° C. until about a 3% weight increase of the resulting reaction mixture is obtained. This takes about 21 grams (0.59 mole) of chlorine. The reaction mixture is then dissolved in benzene washed acid free with water and sodium hydroxide, and then distilled. 558 grams (3 moles) of the resulting chlorinated m-phenoxyphenol (containing chlorine mainly in the 2, 4 and 6 positions) are then reacted with 140 grams (2.5 moles) of potassium hydroxide to form the potassium salt of the chlorinated m-phenoxyphenol. A typical quantity of the salt obtained under three conditions is 560 grams (2.5 moles).

236 grams (1 mole) of dibromobenzene, 560 grams (2.5 moles) of the potassium salt of the chlorinated m-phenoxyphenol and 5 grams (0.035 mole) of cuprous oxide are admixed and the temperature of the resulting mixture is established and maintained at 180–185° C. for two hours. The resulting reaction mixture is dissolved in benzene and water washed free of inorganic and phenolic materials. A typical quantity of washed reaction mixture (less benzene) thus obtained is about 344 grams. About 330 grams of the reaction mixture (not counting the benzene) are then distilled. The product thus obtained is polyphenyl ether substituted with chlorine typically at a concentration of 1.2% by weight of the distilled product and bromine typically at a concentration of 2.0% by weight of the distilled product. A typical quantity of the product thus obtained is 168 grams (0.377 mole).

Example 4

This example illustrates another process for making a polyphenyl ether substituted by chlorine.

74 grams (0.5 mole) of m-dichlorobenzene, 280 grams (1.25 moles) of the potassium salt of m-phenoxyphenol and 5 grams (0.035 mole) of cuprous oxide are admixed in an autoclave and the mixture is established and maintained at 220–250° C. for two hours. The resulting reaction mixture is dissolved in benzene and washed free of inorganic and phenolic materials, giving a crude product. A typical quantity of the crude product (not counting the benzene) is 136 grams. The crude product is then distilled to give the desired product. It consists essentially of a polyphenyl ether substituted by chlorine typically at a concentration of 2.12% by weight of the product. A typical quantity of the desired product is 51 grams (0.114 mole).

Example 5

This example illustrates the preparation of another polyphenyl ether substituted by chlorine.

270 grams (1.0 mole) of dibromo-chlorobenzene, 560 grams (2.5 moles) of the potassium salt of m-phenoxyphenol and 5 grams (0.035 mole) of cuprous oxide are admixed and the mixture is established and maintained at 180–185° C. for three hours. The resulting reaction mixture is dissolved in benzene and washed free of inorganic and phenolic materials. A typical quantity of the crude product (not counting the benzene) thus obtained is 363.5 grams. This crude product is then distilled. The resulting end product consists essentially of a polyphenyl ether substituted by chlorine typically at a concentration of 5.46% by weight of the end product. The substituted polyphenol ether is bis(phenoxyphenoxy)chlorobenzene. A typical quantity of the end product is 326 grams (0.678 mole).

Example 6

This example illustrates the preparation of still another polyphenyl ether substituted with fluorine.

A mixture of 254 grams (1 mole) of fluoro-dibromobenzene, 560 grams (2.5 moles) of the potassium salt of m-phenoxyphenol and 5 grams (0.035 mole) of cuprous oxide is prepared and established and maintained at a temperature of 180–185° C. for two hours. The reaction mixture which results is dissolved in benzene and washed free of inorganic and phenolic materials. A typical quantity of the crude product (not counting the benzene) thus obtained is 236.5 grams. 187 grams of the crude product (not counting the benzene) are then distilled to give the desired end product. The end product is a polyphenyl ether substituted by fluorine. It contains fluorine typically at a concentration of 3.3% by weight of the product. A typical quantity of the end product thus obtained is 103 grams (0.222 mole).

Examples 7–14

These examples illustrate polyphenyl ether compositions of this invention which were actually made by admixing in each case with a polyphenyl ether product of high purity a halogenated polyphenyl ether product of one of the foregoing Examples 1–6.

The polyvinyl ether product of high purity used in each case consisted essentially of bis(phenoxyphenoxy)benzene. The other pertinent data and results obtained in testing typical specimens of the specific compositions involved are set forth in the following table. In the table reference is made to Dornte time and Thermal assay. Dornte time is the time required for the absorption of 0.5 mole of oxygen per 500 grams of the test sample at 600° F. In a standard Dornte type oxidation apparatus. Thermal assey is the weight percent of oil remaining after holding a sample for 48 hours at 825° F. in a 316 stainless steel bomb under an atmosphere of helium or nitrogen.

less than 0.01% by weight and halogenated polyphenyl ether of at least three benzene rings per molecule having halogen substituents selected from the group consisting of chlorine, bromine and fluorine, the total halogen concentration being in the range of about 0.01% to 0.04% by weight.

| Example | Original Halogen Content of Product (percent by wt.) | Original Dornte Time of Product (Hours) | Original Thermal Assay of Product (percent by wt.) | Halogenated Polyphenyl Ether Product Used | Halogen Content of Composition (percent by wt.) | Dornte Time of Composition (Hours) | Thermal Assay of Composition (percent by wt.) |
|---|---|---|---|---|---|---|---|
| 7 | 0.003 Br | 16 | 96 | 1 | 0.04 F | 21 | 93 |
| 8 | 0.000 | 15 | 89 | 2 | 0.03 Br | 27 | 88 |
| 9 | 0.000 | 20 | 96 | 3 | 0.007 Cl 0.013 Br | 40 | 96 |
| 10 | 0.000 | 20 | 96 | 3 | 0.022 Cl 0.041 Br | 56 | 93 |
| 11 | 0.000 | 17 | 96 | 3 | 0.007 Cl 0.013 Br | 33 | 96 |
| 12 | 0.000 | 20 | 96 | 4 | 0.03 Cl | 24 | 94 |
| 13 | 0.000 | 20 | 96 | 5 | 0.03 Cl | 37 | 96 |
| 14 | 0.000 | 20 | 96 | 6 | 0.03 F | 25 | 96 |

These data which are typical, vividly demonstrate the improved results obtained in the practise of the process of this invention.

Other features, advantages and specific embodiments will be apparent to those in the exercise of ordinary skill in the art after reading the foregoing disclosure. In this connection, while specific embodiments of this invention have been described in considerable detail, variations and modifications of these embodiments can be made without departing from the spirit and scope of the invention as described and claimed.

We claim:
1. An oxidation inhibited polyphenyl ether composition comprising a blended mixture of high purity polyphenyl ether having a halogen concentration less than 0.01% by weight and halogenated polyphenyl ether of at least three benzene rings per molecule having halogen substituents selected from the group consisting of chlorine, bromine and fluorine, the total halogen concentration of the composition being in the range of about 0.01% to 0.04% by weight.

2. An oxidation inhibited polyphenyl ether composition comprising a blended mixture of high purity bis-(phenoxyphenoxy)benzene having a halogen concentration less than 0.01% by weight and halogenated polyphenyl ether of at least three benzene rings per molecule having halogen substituents selected from the group consisting of chlorine, bromine and fluorine, the total halogen concentration being in the range of about 0.01% to 0.04% by weight.

3. An oxidation inhibited polyphenyl ether composition comprising a blended mixture of high purity polyphenyl ether having a halogen concentration less than 0.01% by weight and a compound selected from the group consisting of halogenated bis(phenoxyphenoxy) benzene and halogenated bis(phenoxy) benzene, the total halogen concentration being in the range of about 0.01% to about 0.04% by weight.

4. The composition of claim 3 wherein the high purity polyphenyl ether is bis(phenoxyphenoxy)benzene having a halogen concentration less than 0.01% by weight.

References Cited

UNITED STATES PATENTS

| 2,254,404 | 9/1941 | Winning. |
| 2,282,343 | 5/1942 | Prutton _____ 252—54.6 |
| 3,151,080 | 9/1964 | Archer _____ 260—611.5 X |
| 2,940,929 | 6/1960 | Diamond _____ 260—613 X |
| 3,159,684 | 12/1964 | Merica _____ 260—613 |
| 3,268,478 | 8/1966 | Brown et al. _____ 260—613 X |

BERNARD HELFIN, *Primary Examiner.*